United States Patent
Zabalza et al.

(10) Patent No.: US 10,352,304 B2
(45) Date of Patent: Jul. 16, 2019

(54) VARIABLE IMPEDANCE DEVICE FOR A WIND TURBINE

(71) Applicant: INGETEAM POWER TECHNOLOGY, S.A., Zamudio-Vizcaya (ES)

(72) Inventors: Francisco Javier Chivite Zabalza, Stafford (GB); Carlos Girones Remirez, Sarriguren (ES); Ainhoa Carcar Mayor, Sarriguren (ES); Eneko Olea Oregi, Zamudio (ES); Jesus Lopez Taberna, Navarra (ES)

(73) Assignee: INGETEAM POWER TECHNOLOGY, S.A., Zamudio, Vizcaya (ES)

( * ) Notice: Subject to any disclaimer, the term of this patent is extended or adjusted under 35 U.S.C. 154(b) by 0 days.

(21) Appl. No.: 15/105,967

(22) PCT Filed: Dec. 17, 2014

(86) PCT No.: PCT/IB2014/003222
§ 371 (c)(1),
(2) Date: Jun. 17, 2016

(87) PCT Pub. No.: WO2015/092553
PCT Pub. Date: Jun. 25, 2015

(65) Prior Publication Data
US 2016/0333856 A1 Nov. 17, 2016

Related U.S. Application Data

(60) Provisional application No. 61/917,538, filed on Dec. 18, 2013.

(51) Int. Cl.
F03D 9/00 (2016.01)
F03D 9/25 (2016.01)
(Continued)

(52) U.S. Cl.
CPC .......... F03D 9/255 (2017.02); G05F 5/00 (2013.01); H02H 7/06 (2013.01); H02J 3/1807 (2013.01);
(Continued)

(58) Field of Classification Search
CPC F03D 9/255; F03D 9/25; H02J 3/1807; H02J 3/386; H02P 9/007; H02P 9/102; H02P 9/16
(Continued)

(56) References Cited

U.S. PATENT DOCUMENTS 2,402,258 A 6/1946 Roseby et al.
2,578,235 A 12/1951 Few
(Continued)

FOREIGN PATENT DOCUMENTS

EP 0 677 911 A1 10/1995
EP 1 803 932 A1 7/2007
(Continued)

OTHER PUBLICATIONS

International Search Report of PCT/IB2014/003222 dated Jul. 2, 2015.
(Continued)

*Primary Examiner* — Julio C. Gonzalez
(74) *Attorney, Agent, or Firm* — Sughrue Mion, PLLC

(57) ABSTRACT

A wind turbine that includes a housing, an asynchronous generator disposed in the housing and configured to be electrically connected to a power grid connection; a power converter circuit disposed in the housing and configured to be electrically connected to the asynchronous generator; and a variable impedance device disposed in the housing, connected to the generator and configured to limit current by varying impedance in response to a transient current. The wind turbine delivers reactive power to the power grid when
(Continued)

the variable impedance device varies impedance in response to the transient current. The variable impedance device can be arranged in series between the asynchronous generator and the power grid connection, or can be in a shunt arrangement between the asynchronous generator and a neural point.

20 Claims, 16 Drawing Sheets

(51) Int. Cl.
    *H02H 7/06*     (2006.01)
    *H02P 9/10*     (2006.01)
    *H02P 9/00*     (2006.01)
    *H02P 9/16*     (2006.01)
    *H02J 3/18*     (2006.01)
    *H02J 3/38*     (2006.01)
    *G05F 5/00*     (2006.01)

(52) U.S. Cl.
    CPC ............ *H02J 3/1835* (2013.01); *H02J 3/386* (2013.01); *H02P 9/007* (2013.01); *H02P 9/102* (2013.01); *H02P 9/16* (2013.01); *Y02E 10/725* (2013.01); *Y02E 10/763* (2013.01); *Y02E 40/30* (2013.01)

(58) Field of Classification Search
    USPC ....... 290/44, 55; 700/286, 287, 288; 307/60, 307/43
    See application file for complete search history.

(56) References Cited

U.S. PATENT DOCUMENTS

| | | | | |
|---|---|---|---|---|
| 2,731,590 | A * | 1/1956 | Smith | H03B 27/00 307/149 |
| 3,293,447 | A * | 12/1966 | Fleming | H03F 3/12 307/424 |
| 3,443,206 | A * | 5/1969 | Bradley | G01R 1/28 323/233 |
| 4,347,539 | A * | 8/1982 | Peterson | H01C 7/12 361/16 |
| 4,434,376 | A * | 2/1984 | Hingorani | H02J 3/1807 307/102 |
| 5,127,085 | A | 6/1992 | Becker et al. | |
| 5,172,046 | A | 12/1992 | Dittner et al. | |
| 5,686,766 | A | 11/1997 | Tamechika | |
| 5,902,506 | A | 5/1999 | Scott et al. | |
| 7,245,037 | B2 | 7/2007 | Angquist et al. | |
| 7,253,537 | B2 * | 8/2007 | Weng | H02P 9/006 290/44 |
| 7,518,256 | B2 * | 4/2009 | Juanarena Saragueta | H02P 6/005 290/44 |
| 7,919,879 | B2 | 4/2011 | Flannery et al. | |
| 7,939,954 | B2 | 5/2011 | Ruiz Flores et al. | |
| 7,960,849 | B2 | 6/2011 | Lopez Taberna et al. | |
| 8,541,898 | B2 * | 9/2013 | Acedo Sanchez | H02P 9/006 290/44 |
| 8,692,523 | B2 * | 4/2014 | Drobnjak | H02J 3/38 290/44 |
| 8,810,985 | B2 * | 8/2014 | Demetriades | H02H 3/023 361/102 |
| 2003/0015873 | A1 | 1/2003 | Khalizadeh et al. | |
| 2003/0048006 | A1 | 3/2003 | Shelter, Jr. et al. | |
| 2004/0245783 | A1 | 12/2004 | Gilbreth et al. | |
| 2006/0267560 | A1 | 11/2006 | Rajda et al. | |
| 2008/0018309 | A1 | 1/2008 | Erdman et al. | |
| 2008/0137382 | A1 | 6/2008 | Datta et al. | |
| 2009/0079191 | A1 | 3/2009 | Mari et al. | |
| 2009/0167088 | A1 | 7/2009 | Llorente Gonzalez et al. | |
| 2010/0123313 | A1 | 5/2010 | Hobdy | |
| 2012/0061961 | A1 * | 3/2012 | Yasugi | F03D 7/0284 290/44 |

FOREIGN PATENT DOCUMENTS

| | | |
|---|---|---|
| EP | 2 293 431 A2 | 3/2011 |
| EP | 2 472 532 A1 | 7/2012 |
| EP | 2 581 601 A1 | 4/2013 |
| ES | 2298014 A1 | 5/2008 |
| WO | 98/27635 A1 | 6/1998 |
| WO | 03/065567 A1 | 8/2003 |
| WO | 2006/070958 A1 | 7/2006 |
| WO | 2011/117431 A1 | 9/2011 |

OTHER PUBLICATIONS

Written Opinion dated Jul. 2, 2015 from the International Searching Authority issued in counterpart Application No. PCT/IB2014/003222.
S. Eckroad, "Superconducting Fault Current Limiters", Technology Watch 2009, 1017793, Technical Update, Dec. 2009, Electric Power Research Institute, 58 pages.
S. Eckroad, "Survey of Fault Current Limiter (FCL) Technologies-Update", EPRI, Palo Alto, CA: Aug. 2008. 1016389, 54 pages.
S, Eckroad, "Survey of Fault Current Limiter (FCL) Technologies". EPRI, Palo Alto, CA: Aug. 2005. 1010760, 72 pages.
A. Neumann, "Application of Fault Current Limiters," BERR, Department for Business Enterprise & Regulatory Reform, 2007, 39 pages.
Nelson, A. et al., "Saturated-Core Fault Current Limiter Field Experience at a Distribution Substation," CIRED, 21st International Conference on Electricity Distribution, Frankfurt, Jun. 6-9, 2011, Paper 0680, 4 pages.
A. Nelson et al., "Design, Test and Demonstration of Saturable-Core Reactor HTS Fault Current Limiter", U.S. Department of Energy Annual Peer Review, Alexandria, VA, Jun. 29-Jul. 1, 2010, pp. 1-58.
Bob Lawrence & Assoc., Inc., "Superconductivity News Update, Bringing New Power to Electricity," Dept. of Energy, Superconductivity, Oct. 2007, 6 pages.
E. Chong et al., "A novel concept for a fault current limiter,". The 8th IEE International Conference on AC and DC Power Transmission (ACDC 2006), vol. 251, No. 255, Mar. 2006 5 pages.
J. López, "Ride through of wind turbines with doubly fed induction generator under symmetrical voltage dips", IEEE Transactions on Industrial Electronics, vol. 56, No. 10, pp. 4246-4254, Oct. 2009.
M. Rahimi et al., Efficient control scheme of wind turbines with doubly fed induction generators for low-voltage ride-through capability enhancement, IET Renewable Power Generation, 2010, vol. 4, Issue. 3, pp. 242-252.
X. Yan et al., "Low Voltage Ride Through for DFIG Wind Turbines Using Passive Impedance Networks," International Conference on Sustainable Power Generation and Supply (SUPERGEN), Nanjing, China, Apr. 6-7, 2009, 9 pages.
P.S. Flannery et al, "Evaluation of Voltage Sag Ride-Through of a Doubly Fed Induction Generator Wind Turbine with Series Grid Side Converter," IEEE 38th Annual Power Electronics Specialists Conference, PESC07, Jun. 17-21, 2007,7 pages.
L. Ye et al., "Study of Superconducting Fault Current Limiters for System Integration of Wind Farms," IEEE Transactions on Applied Superconductivity, vol. 20, No. 3, Jun. 2010, pp. 1233-1237.
Eduard Muljadi et al., "Fault-Current Limiter (FCL) Application in a Wind Power Plant", National Renewable Energy Laboratory,WINDPOWER 2011, Anaheim California, May 22-25, 2011, NREL/PO-5500-51285, 1 page.
E. Muljadi et al., "Wind Power Plant Enhancement with a Fault-Current Limiter", National Renewable Energy Laboratory, NREL/CP-5500-49781, Mar. 2011, 10 pages.
M. Elshiekh et al., Improving Fault Ride-Through Capability of DFIG-Based Wind Turbine Using Superconducting Fault Current Limiter,' IEEE Transactions on Applied Superconductivity, vol. 23, No. 3, Jun. 2013, 4 pages.

(56) References Cited

OTHER PUBLICATIONS

Anju M et al., "Power System Stability Enhancement and Improvement of LVRT Capability of a DFIG Based Wind Power System by Using SMES and SFCL", International Journal of Electrical and Computer Engineering (IJECE), vol. 3, No. 5, Oct. 2013, pp. 618-628, ISSN: 2088-8708.

Kone Ibrahima et al., "Wind Turbine using Doubly-Fed Induction Generator Protection during Fault", International Conference on Information, Business and Education Technology (ICIBIT 2013), Atlantis Press, 2013, pp. 1130-1336.

\* cited by examiner

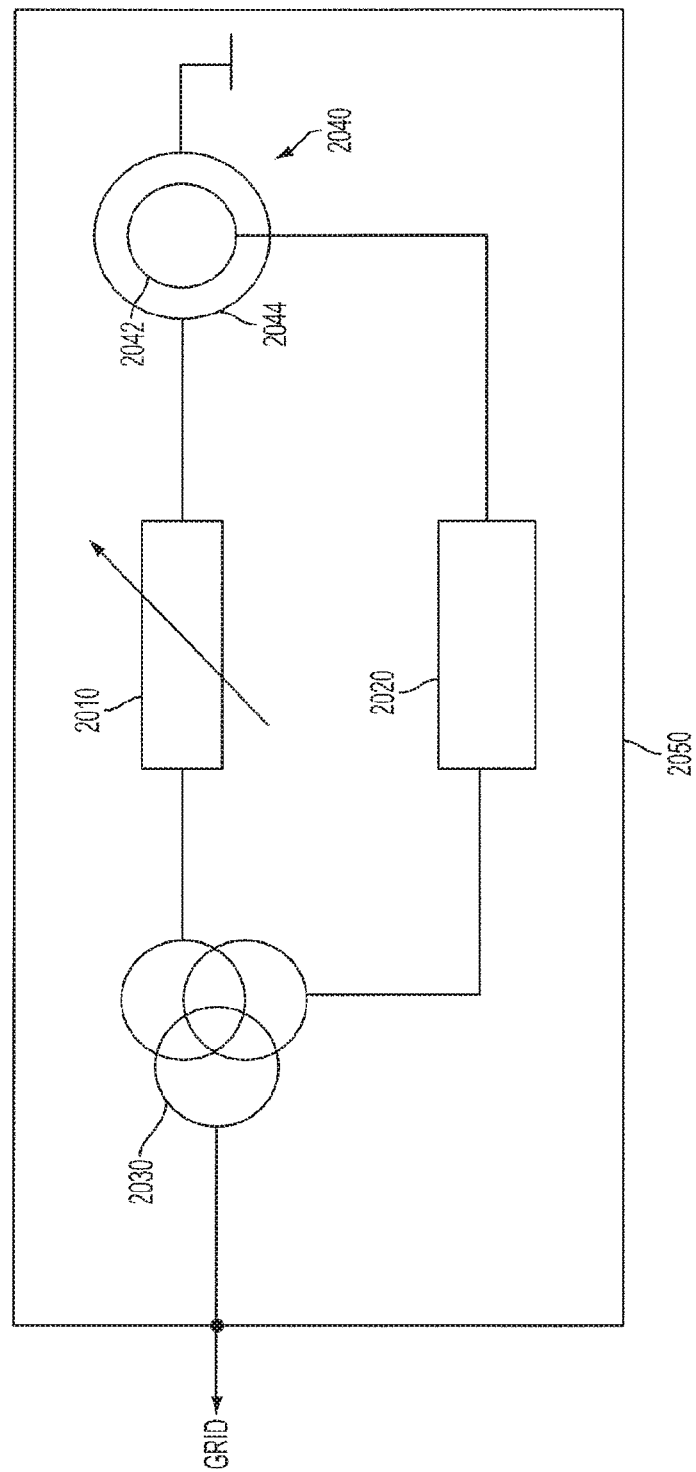

VARIABLE IMPEDANCE DEVICE FOR A WIND TURBINE

CROSS-REFERENCE TO RELATED APPLICATION

This application is a National Stage of International Application No. PCT/IB2014/003222 filed Dec. 17, 2014, claiming priority based on U.S. Provisional Patent Application No. 61/917,538 filed Dec. 18, 2013, the contents of all of which are incorporated herein by reference in their entirety.

BACKGROUND

1. Technical Field

Apparatuses and methods consistent with exemplary embodiments relate to the use of variable impedance devices, for example Fault Current Limiter (FCL) devices, and variable impedance networks in wind turbine systems, to mitigate the effects caused by power grid disturbances such as voltage dips. Certain embodiments are configured to facilitate compliance with grid codes that are imposed upon such systems.

2. Background Art

Variable impedance devices, such as FCL devices, have recently been developed that can mitigate the increasing fault current levels during transmission and distribution in electrical power networks. Some of these developments have been accompanied by recent advances in superconductor technologies, which have resulted in, for example, super conductor fault limiter devices (SFCL) being developed. FCL devices may be divided into two main types: "permanent impedance increase" type and "condition-based impedance increase" type, which may also be referred to as "permanent impedance change" and "condition-based impedance change," respectively. The former presents the same mode of operation in both normal and fault conditions, whereas the latter experiences a fast change of impedance during a fault.

Some examples of "permanent impedance change" FCL devices include current limiting reactors, typically air cored, high impedance transformers, which may increase the voltage level, and any other topological measures that may lower the stiffness of the system by reducing the degree of meshing, such as splitting the system into sub-grids or any kind of bus-bar splitting. The stiffness of the system is high or stiff when the source impedance is low and the available fault current is high. Thus, any topological measure which increases impedance and lowers a fault current may lower the system stiffness. According to another understanding, in a 'stiff' system the reduction of source terminal voltage is much less than it would be on a 'soft' system during a short circuit condition.

"Condition-based impedance change" FCL devices may be either passive or active, and may be connected in series or in a shunt arrangement. An example of a passive type, condition-based impedance change device is a current limiting fuse. These develop an arcing voltage high enough to effectively limit the current. Two types of current limiting fuses that may be used include stand-alone high voltage (HV) fuses and commutation fuse-based limiters.

Both "permanent impedance change" FCL and "condition-based impedance change" FCL devices could be of the "passive" or "active" type. In the case of "passive" FCL devices, the impedance change can happen naturally, as the device is stressed by the presence of fault currents, without being controlled by another device or circuit, and may therefore be called an uncontrolled, non-controlled, or passive device. In the case of "active" FCL devices the impedance change can be triggered by control circuitry, and may be called a controlled or active device. FCL devices may be connected in series with the power flow, although they are sometimes connected in a shunt fashion, diverting some of the fault currents to, for instance, the system ground. When connected in series, they may exhibit low impedance that increases rapidly during a fault event. Conversely, when connected in a shunt fashion they experience high impedance that reduces rapidly during a fault condition.

Advances in superconducting material technology have contributed to the development of FCL devices, particularly those of a "condition-based impedance change" passive type. For example, superconducting materials show a very low electric resistance, thereby simultaneously keeping the current density, temperature, and magnetic field below certain threshold values. If any of those values, typically the current density or the magnetic field, rises above the threshold in the presence of a fault current level, the material experiences a substantial impedance change that contributes to mitigation of the fault current level. This impedance increase causes additional heat dissipation, causing a subsequent temperature rise that forces the conductor further out of the superconducting region. The temperature threshold for superconducting operation is very low, in the vicinity of 4° K., or in the region of 70° K., in the case of High Temperature Superconductivity (HTS). For that reason, superconducting materials are stored in cryogenic chambers. Not all passive FCL technologies require the use of superconducting technologies.

Wind turbines based on the doubly fed induction generator (DFIG), such as doubly fed machine (DFM) shown in FIG. 1A or exciter based doubly fed machine (xDFM) shown in FIG. 1B, may be very sensitive to grid disturbances and especially sensitive to voltage dips. Overvoltages and overcurrents may occur in the rotor windings in response to abrupt drops in grid voltage that can damage the power converter if no protection is provided. A way to mitigate this transient while protecting the converter includes connecting a so-called crowbar circuit in a shunt fashion, also known as a shunt arrangement, between the rotor terminals and the converter. FIG. 1A shows a wind turbine generator 10 with a conventional active crowbar circuit 20 coupled to a back-to-back type converter 30 and a DFIG 40. The back-to-back (B2B) converter 30 includes a rotor-side or machine-side converter (MSC) 31 and a grid-side converter (GSC) 32, also known as a front-end converter or line-side converter, that are linked through a DC link or DC bus. Three phases of the rotor of the DFIG can be connected to the crowbar circuit 20 and the MSC 31, as shown in FIG. 1A. Three phases of the stator of the DFIG 40 are connected to the power grid through a transformer and three phases of the transformer are connected to the GSC 32. Upon detection of a voltage fault, the active crowbar circuit 20 short circuits the rotor of the DFIG 40 by means of a resistance element, simultaneously deactivating the MSC 31. The rotor current then flows through the crowbar 20, diverting it from the MSC 31, or according to another example directing it from the GSC 30, thereby protecting the back-to-back converter 30. The resistance imposed by the crowbar 20 helps by damping the change of flux transient, reducing the duration and magnitude of the overvoltages and overcurrents. However, the crowbar circuit 20 is costly, and bulky. For example, the crowbar may include passive and active devices, such as diodes and insulated-gate bipolar transistors (IGBTs), and a set of high-power resistors. Furthermore, the current loop established between the crowbar circuit and the converter has a high inductance and is bound to produce a significant overvoltage on the crowbar IGBT terminals at turn off. For that reason, the crowbar may incorporate resistance/capacitance (RC) damping networks and/or varistor devices to mitigate that overvoltage. The crowbar circuit may have several IGBT and resistor branches that are activated gradually as the transient evolves. Furthermore, when the crowbar turns-off, the MSC 31 may generate a voltage that contributes to mitigating the stator-flux transient created by the voltage dip.

Another configuration of a wind turbine is shown in FIG. 1B, which employs an exciter based doubly fed machine (xDFM). In FIG. 1B an exciter machine 50 is connected between the DFIG 40 and the front-end converter side of the converter 30. A conventional brake chopper 20 is connected in the DC link of the converter 30, between the machine-side converter (MSC) 31 and a grid-side converter (GSC) 32.

There are several alternatives to the shunt crowbar circuit or the brake chopper shown in FIGS. 1A and 1B, whereby the damping resistors are connected in series with the power flow. For example, FIG. 2 shows a wind turbine generator 10 equipped with a series active crowbar 21 connected between the stator of the DFIG 40 and the grid that is configured to protect the DFIG 40, the MSC 31, and the GSC 32. These options can be classified as a type of series connected, active, condition-based impedance change, FCL device. For example, a resistive FCL network 21 is connected in series with the stator windings of the DFIG 40, as seen in FIG. 2. The resistive FCL network 21 may include a resistance element Rcrow 22, which could be a set of three resistors each in parallel with bidirectional static switches 23a and 23b. These switches may be, for instance, composed of two gate turn-off thyristors (GTO) or integrated gate commutated thyristors (IGCT), connected in a back-to-back manner. A combination of a series and shunt active FCL networks may also be employed. An alternative to this is to connect the FCL device to a set of open-end terminals on the stator. These circuits may be complicated by the presence of the static switches, which, not only require the use of control and gate drive circuitry, but also need overvoltage protection during turn on.

A family of series connected, active, and/or condition-based impedance change FCL devices that are connected outside the wind turbine may exist. These devices serve multiple wind turbine generators such as wind turbine generators in a wind farm. These devices have an inverter connected in series with the main power flow, so that a voltage can be injected to mitigate the transient caused by the voltage dip. However, such systems add a high degree of complexity which affects the cost and reliability of the whole solution.

For example, the use of fault current limiter FCL of the passive, condition-based impedance change type may be used at the wind farm level. FIG. 3 shows a single-wire diagram of a super conductor FCL (SFCL) connected before the wind farm's interconnection point at the wind farm's Point of Common Coupling (PCC). The FCL employed at the wind farm level may be an SFCL 50. Specifically, the SFCL 50 is placed outside of all the wind farm's wind turbines 10 between the PCC 51 and power grid network 52. Not only does the SFCL 50 placed between the PCC 51 and power grid network 52 serve multiple wind turbines to control fault currents but it may also suppress inrush currents, when a wind farm has adopted an SFCL at the system interconnection point.

Another type of active condition-based FCL, also connected between the PCC and the power grid network, is based on a variable impedance network connected in a shunt manner to ground. Such a variable impedance network may be implemented using a variable inductor, which has a main winding for conducting alternating current and a DC control winding for conducting direct current. This type of inductor usually has the control winding wound in an orthogonal manner to the main flux in the core, so that the DC winding does not see any of the AC current, facilitating the control power supply. These two conventional approaches do not connect the FCL at the individual wind-turbine level, but rather connect the FCL at the wind farm system level.

Although these wind farm level FCLs can help mitigate adverse effects on the wind turbine supply voltage, they do not ensure the protection of the wind turbine converter equipment under grid disturbances. Also, they do not help satisfy the compliance of the wind turbine with grid codes and customer requirements, since wind turbine validation usually is a type of test performed on an individual wind turbine, at its power input terminals. Accordingly, the conventional use of FCLs at the wind farm level does not help individual wind turbines comply with such grid codes and customer requirements. As such, there is a long-felt but unmet need to satisfy these grid code and customer compliance requirements at the individual wind turbine's interface with a network or grid, as well as to protect the wind turbine's converter, avoiding the need of expensive solutions at the wind farm level.

SUMMARY

According to an aspect of an exemplary embodiment, there is provided a wind turbine includes a housing; an asynchronous generator disposed in the housing and configured to be electrically connected to a power grid connection; a power converter circuit disposed in the housing and configured to be electrically connected to the asynchronous generator; and a variable impedance device disposed in the housing, connected to the generator and configured to limit current by varying impedance in response to a transient current.

According to an aspect of another exemplary embodiment the variable impedance device is arranged in series between the asynchronous generator and the power grid connection.

According to an aspect of yet another exemplary embodiment the wind turbine further includes a fixed impedance device connected in parallel with the variable impedance device.

According to an aspect of still another exemplary embodiment variable impedance device is a variable inductor.

According to an aspect of another exemplary embodiment fixed impedance device is a resistor.

According to an aspect of an exemplary embodiment the variable impedance device is connected in a shunt arrangement between the asynchronous generator and a neutral point.

According to an aspect of another exemplary embodiment the wind turbine further includes a fixed impedance device connected in series with the asynchronous generator and the variable impedance device.

According to an aspect of an exemplary embodiment the wind turbine further includes a controller configured to control the variable impedance device in response to detection of the transient current to vary impedance.

According to an aspect of another exemplary embodiment the variable impedance device limits current by passively varying impedance in response to the transient current.

According to an aspect of an exemplary embodiment the variable impedance device is selected from a group consisting of a variable inductor, a fault current limiter (FCL), a super conductor FCL (SFCL), a magnetic amplifier and saturable core FCL (MFCL), a diode-bridge FCL with DC biased coil, and an embedded magnet and saturable core FCL device.

According to an aspect of another exemplary embodiment the wind turbine further includes a second variable impedance device disposed in the housing, electrically connected to the asynchronous generator, and configured to vary impedance in response to the transient.

According to an aspect of yet another exemplary embodiment the wind turbine delivers reactive power to the power grid when the variable impedance device varies impedance in response to the transient current.

According to an aspect of an exemplary embodiment a wind turbine includes a housing; an asynchronous generator configured to be electrically connected to a connection to a power grid and generate a current; a power converter circuit configured to be electrically connected to the asynchronous generator and convert the current; means for varying impedance to limit the converted current in response to a transient current, said asynchronous generator, said power converter circuit and said means for varying impedance disposed in the housing.

According to an aspect of an exemplary embodiment a method for controlling current in a wind turbine includes generating a current using an asynchronous generator disposed in a housing of the wind turbine; converting the current using a power converter circuit disposed in the housing; limiting the converted current in response to a transient current in a power grid by varying impedance of a variable impedance device disposed in the housing and electrically connected to the asynchronous generator; and outputting the limited current to a connection to the power grid.

According to an aspect of another exemplary embodiment the method further includes controlling the variable impedance device in response to detection of the transient current to vary impedance.

According to an aspect of yet another exemplary embodiment the method further includes the variable impedance device limiting current by passively varying impedance in response to the transient current.

Other aspects and advantages will be apparent from the following description and the appended claims.

BRIEF DESCRIPTION OF DRAWINGS

FIG. 20 shows a wind turbine system including a housing and the elements located within the housing according to an exemplary embodiment.

DETAILED DESCRIPTION

Figure 1A:
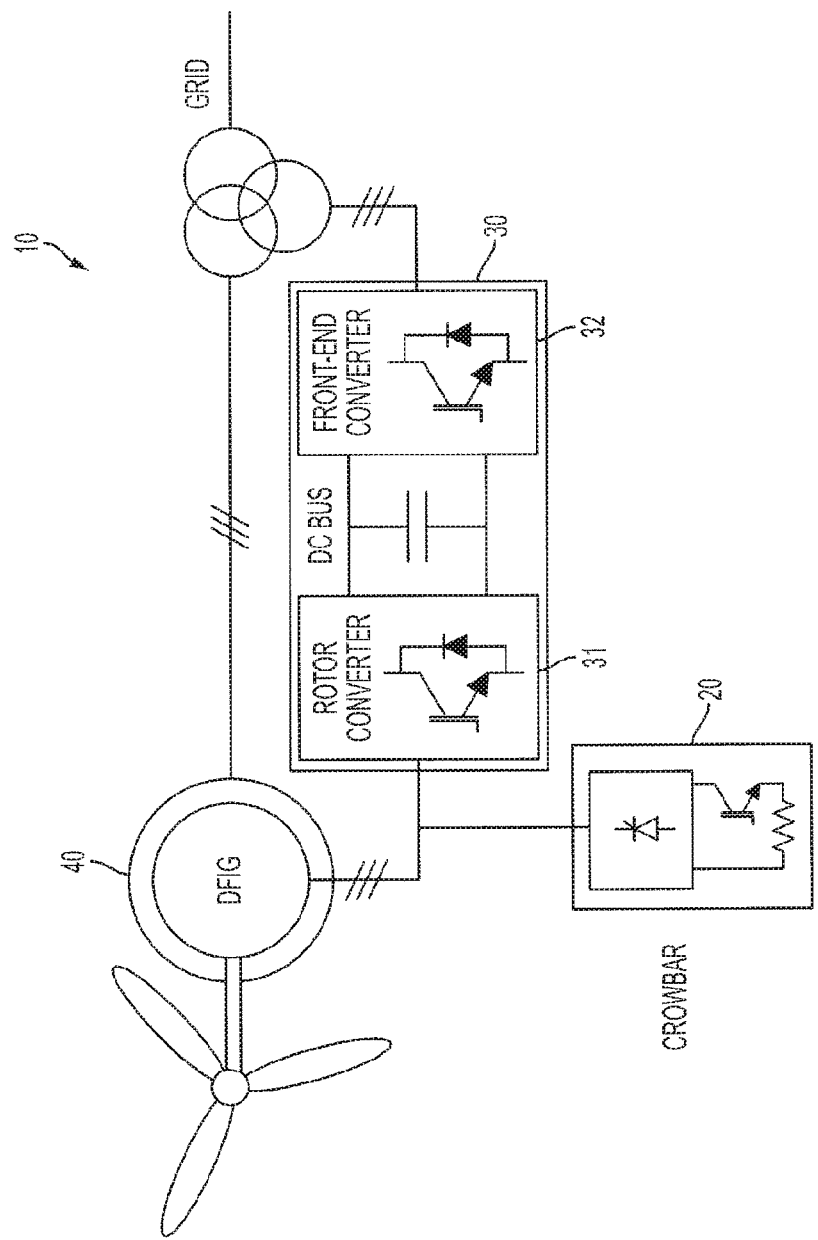
FIGS. 1A and 1B illustrate wind turbines equipped with an active shunt crowbar circuit.

The following detailed description is provided to assist the reader in gaining an understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

It will be understood that when the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

One or more exemplary embodiments includes the connection of variable impedance devices, for example FCL devices, to a wind-turbine, in any convenient location within the wind turbine, that achieves a substantial limitation of the converter currents and voltage during a transient created by a voltage dip or any other grid disturbance. According to one or more exemplary embodiments, the variable impedance devices, as described here, will be understood as being additional devices installed in the wind turbine, and not as component part of the installation necessary for the generation of electrical power from the wind that, because of their construction or characteristics, happen to change their impedance depending on the operating conditions, such as a conductor's impedance change with frequency or a transformer's or generator's saturation with high currents. Said another way, and in accordance with one or more exemplary embodiments, there are system components that have impedance characteristics that naturally vary, but that a person of ordinary skill in the art would not consider or as being a variable impedance device, such as, for example, a conductor's impedance change with frequency, or a transformer's or generator's saturation. If connected in series with the power flow, the FCL devices can be of the active or passive, "condition-based impedance change" type, so that they change impedance during the transient, with or without the intervention of any external control circuit. If connected in a shunt manner, for instance between the rotor-side windings of a DFIG machine and the machine side converter (MSC), they will include a variable impedance network of the active "condition-based impedance change" type.

The system components within the wind turbine are electrically connected to each other. Being electrically connected means an electrical path exists between the system components which may or may not have other components therebetween. The system components may be electrically connected in parallel, series, shunt, and/or a combination of these arrangements. Further, the system components may be electrically connected to each other through other elements or may be directly connected to each other. For example multiple resistors may be electrically connected in series. Further, the first and last resistors are electrically connected to each other despite the intervening resistors being connected therebetween. Similarly, a variable impedance device which may be designed to limit current to a generator as its function is electrically connected to the generator, while possibly having other elements therebetween. According to one or more exemplary embodiments, system components may include a generator, a converter, a variable impedance device, an FCL, a resistor, and/or a transformer. Accordingly, devices, elements or other components described as connected will be understood to be electrically connected unless otherwise specified.

According to one or more exemplary embodiments, a variable impedance device is configured such that it will respond to current as opposed to a voltage. For example, in an exemplary embodiment that utilizes a variable inductor, a high current level may drive the inductor out of saturation where the inductor is normally saturated by the presence of an embedded magnet. In another exemplary embodiment, the variable impedance device is implemented with a superconducting FCL (SFCL). In this case a high current level will force the device out of the superconducting region. In another example, a controllable inductor is placed in series with the stator and grid connection and is controlled by a control system that responds to a current increase detected by a current sensor. In yet another example, the variable impedance device is a variable resistive element. Thus, according to one or more exemplary embodiments, when the variable impedance device is connected in series it may efficiently mitigate a current transient caused by a supply overvoltage by being configured to correspond to the change in current.

In accordance with another exemplary embodiment, a variable impedance device may be connected in series with a rotor winding of a DFIG wind turbine. In this embodiment the variable impedance device may still operate in an automatic, but passive, manner. Alternatively, the variable impedance device may be actively controlled using a control circuit. In both cases the variable impedance device is configured such that it reacts in response to a current, or current transient as may be the case. In DFIG systems, a rotor overvoltage is produced as a consequence of grid voltage dips. Thus, in the case where a variable impedance device is connected in series to the rotor windings and designed to increase its impedance when the voltage at its terminals decreases, the resulting effect might not be beneficial. In this case, the impedance would not increase when a voltage dip occurs. A solution is to use an impedance that changes with current flow instead of voltage for passive type devices, or a control based on current measurement instead of voltage for active type devices.

According to another exemplary embodiment, the series variable impedance device may be implemented using any of a variety of devices where the selected device may be placed in any of a variety of locations in the power circuits in the wind turbine. Further, according to one or more exemplary embodiments the variable impedance device may also be used in a series and/or in a shunt arrangement.

Figure 4A:
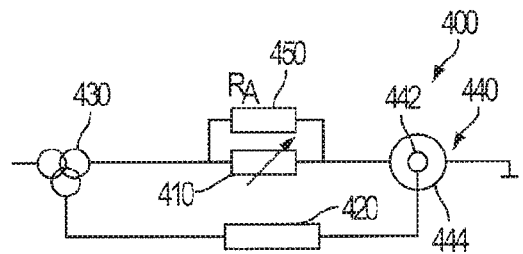
FIGS. 4A through 4C illustrate wind turbine configurations including a variable impedance device according to one or more exemplary embodiments.

According to an exemplary embodiment as shown in FIG. 4A, a wind turbine 400 includes a variable impedance device 410 connected in series between a generator 440 (which can have a stator 444 and a rotor 442) and a transformer 430. According to another exemplary embodiment, the variable impedance device is connected in series between the generator and the grid directly without a transformer, and is located with the generator within the wind turbine housing. In the same way, the embodiments described here can be used with other wind turbine configurations in which the main step up/down transformer has different connection points and rated power (FIG. 18). The different configurations used in wind turbines are known to those skilled in the art, such as configurations in which the converter is connected to the grid through the third winding of the main transformer, a configuration in which the converter is connected to the grid through a dedicated transformer of the converter's rated power and the stator is directly connected to the grid, or a configuration in which the converter is connected to the wind turbine output or stator, and then to a main transformer. It is understood by those skilled in the art which of these wind turbine configurations to use depending on the circumstances. The size and activation limits of the variable impedance device employed will depend on the specific wind turbine configuration. In each case, the voltage level may be different in the different locations where the variable impedance device could be connected, and because of the different impedances of each transformer type, the maximum current and voltage levels the variable impedance device should withstand may vary.

The exemplary embodiment may include other conventional system components for the generation of power, such as, for example, a power converter circuit 420 connected between the generator 440 and the transformer 430, parallel to the variable impedance device 410. Accordingly, the wind turbine, using the power converter circuit 420 and/or the transformer 430, converts the current by changing the current from either AC to DC or DC to AC, changing a voltage, and/or changing a frequency.

The embodiment may include additional system components such as, for example, a fixed-value impedance device, which may be a resistor $R_A$ 450, connected in parallel across the variable impedance device 410. The resistor may be a fixed value resistor connected in parallel with the variable impedance device and may have a fixed resistance in both a passive state or OFF state, when the resistor does not have current or voltage across it, and an active state or ON state. The variable impedance device 410 may have a low value during normal operation when inductance and impedance are both low. However, when a transient current is incident onto the system shown in FIG. 4A inducing high impedance, the variable impedance device 410, by increasing its impedance, shunts the current through the resistor $R_A$ thereby dissipating power. This arrangement may further lower the time response of the overall circuit making it respond and stabilize quickly. The variable impedance device 410 may, for example, use any of the passive non-controlled variable impedance devices described here, or equivalent devices. Alternatively, a controlled variable impedance device, such as those described here or equivalent devices, may be used for the variable impedance device 410.

According to an exemplary embodiment the fixed impedance device may be a fixed-value resistor $R_A$ connected in parallel across the variable impedance device 410. The resistor $R_A$ may be sized so that it has only a small amount of current flowing through it during normal operation when inductance and impedance are both low. However, when a transient current is incident onto the system shown in FIG. 4A inducing high impedance, the variable impedance device 410 increases its impedance which shunts most of the current through the resistor $R_A$ to dissipate power. This arrangement, because of the L/R time constant, may further speed the response of the overall circuit making it respond and stabilize quickly.

Figure 1B:
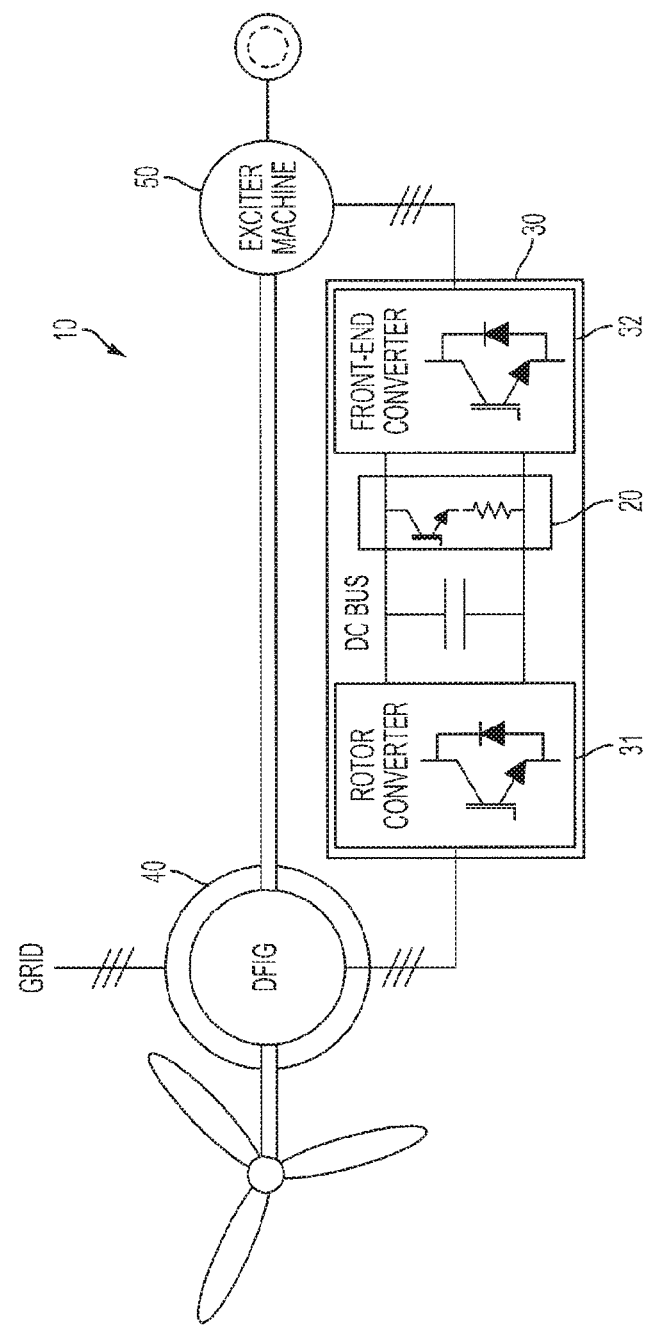

When a voltage dip takes place in a DFIG system, an overcurrent may be generated in the stator windings. The duration of the current transient may be related to the time constant Leq/Req. Leq is primarily defined by the combined leakage inductance of the stator and rotor windings. Req is defined by the sum of the series resistance of the stator and rotor windings, any series resistance that may be placed in series with the stator windings, such as the resistance $R_A$ in parallel with the variable impedance device 410 shown in FIG. 4A, and the crowbar resistance shown in FIG. 1 (or any series resistance connected in a shunt manner to the rotor windings). In contrast, a resistor connected in a shunt manner with the stator windings, may have little or no effect in the mitigation of the current transient for a DFIG system.

In the example embodiment, the following are examples of values of parameters which are given on an order of magnitude basis, to illustrate the effectiveness of the circuit shown in FIG. 4A. A current transient in a typical 3 MW DFIG generator may have a time constant of around 30 ms, with the total transient duration being about 150 ms, regardless of the duration of the voltage dip that initiated the transient. This example contemplates a shunt or crowbar resistor connected at the rotor side, or a brake chopper resistor connected at the DC link with a value of 0.15 Ohms, in a topology like that shown in FIG. 1A or 1B. If a 3 ohm series resistor were connected in series with the stator windings as resistor $R_A$ shown in FIG. 4A, the time constant, and total transient duration are substantially reduced to 5 ms and 25 ms respectively. Furthermore, there is a limit to the maximum value that the shunt crowbar resistor can have, as the voltage across it may never exceed the dc-link voltage of the converter system 420. Because there is no limit for the series resistor $R_A$, other than particular cost and size considerations, placing a series resistance in the stator windings in a suitable manner, as shown in FIG. 4A, is an effective solution to mitigate current transients caused by grid voltage variations.

Figure 4B:
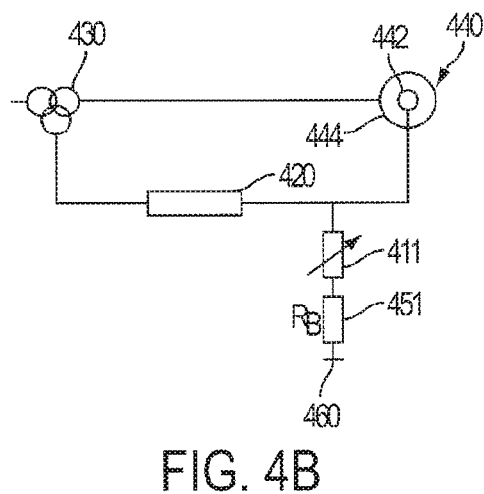

According to another exemplary embodiment, as shown in FIG. 4B, a variable impedance device 411 may be included and connected in series with a resistor $R_B$ 451 to form a shunt variable impedance network. That shunt variable impedance network is connected at one end to the rotor windings of the generator 440 and the power converter system 420 in a shunt manner, while the other end may be connected to a neutral point 460. Specifically, a neutral point 460 may be a point with a different voltage level, such as a ground potential, such as a system ground or earth ground, or may be an arrangement where the impedance network is left open depending on the resistor network $R_B$ 451 arrangement, for example a wye or delta resistor arrangement. The variable impedance 411 may be of the active type, presenting a high value in normal operation and a low value in the event of a fault.

Figure 4C:
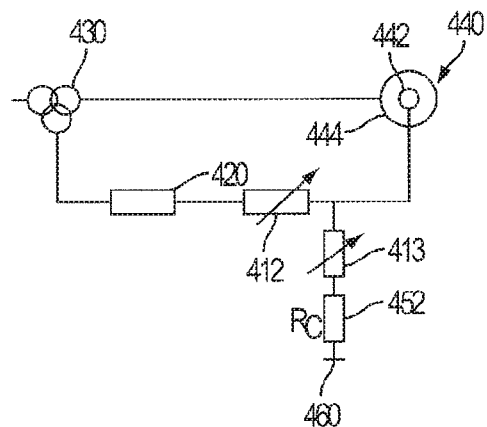

According to another exemplary embodiment as shown in FIG. 4C, there may be another variable impedance device 412 connected in series between the power converter and the rotor windings of the generator 440. This impedance device, which presents a low value during normal operation and a high value during the fault event, can be either of the passive type or of the active type. The shunt variable impedance network, similar to the shunt variable impedance network shown in FIG. 4B, formed as the series connection of an active variable impedance device 413 and a resistor $R_C$ 452, is connected to the series variable impedance device 412 and the generator 440. According to one or more exemplary embodiments, any of the devices shown in FIGS. 4A through 4C are placed within a single housing, wherein the housing may include the entire wind turbine structure, or may be specifically placed within a housing such as a nacelle of a wind turbine.

According to one or more exemplary embodiments, the overall DFIG wind turbine configurations shown in FIGS. 4A, 4B and 4C may be placed within a single housing, wherein the housing may include the entire wind turbine structure, or may be specifically placed within a housing such as a nacelle of the wind turbine.

Figure 5:
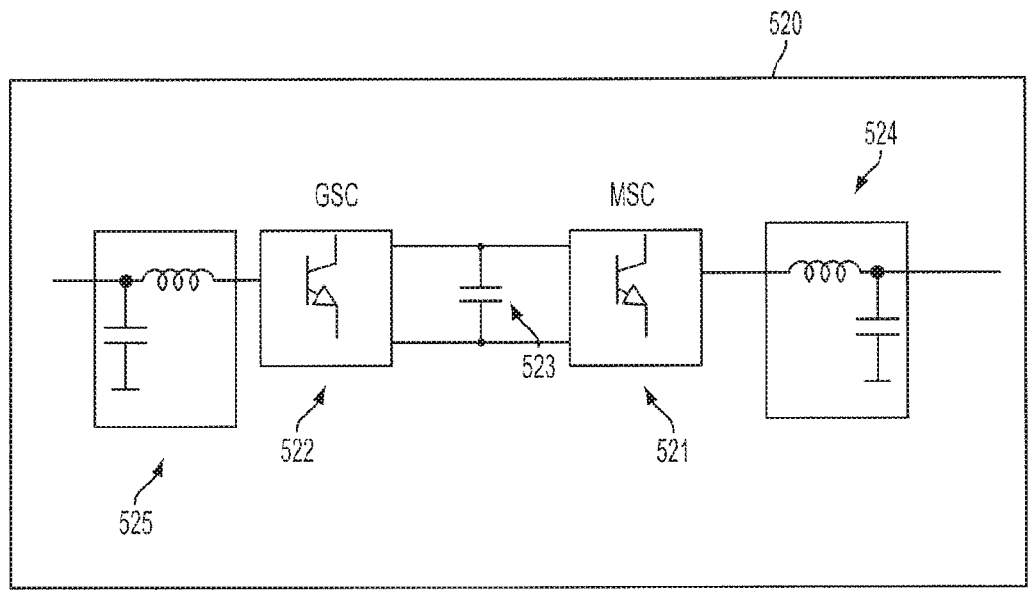
FIG. 5 shows a detailed view of a DFIG power converter configuration.

FIG. 5 shows a detailed view of a configuration of a DFIG power conversion circuit 520 which may be implemented in one or more of the exemplary embodiments. For example, the power converter circuit 420 as shown in FIGS. 4A-4C may be implemented as the DFIG power conversion device 520 shown in FIG. 5. As shown in FIG. 5, the power conversion circuit may include a grid-side filter 525, a grid-side converter (GSC) 522, an energy storage element, typically a capacitor bank 523 (although other elements such that inductors could also be used), a machine-side converter (MSC) 521, and a machine-side filter 524.

Figure 6:
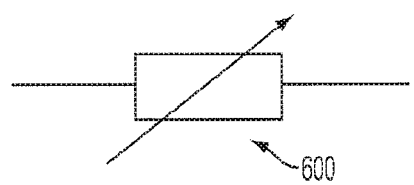
FIG. 6 shows a variable impedance network of either the active or passive type, to form part of a "condition-based impedance change" FCL device according to one or more exemplary embodiments.
Figure 7:
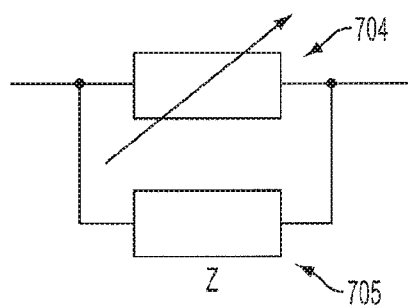
FIG. 7 shows a variable impedance network of the type, "condition-based impedance change" FCL device in parallel with a fixed impedance network according to one or more exemplary embodiments.
Figure 8:
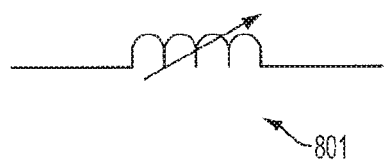
FIG. 8 shows a variable inductor of either the active or passive type, "condition-based impedance change" FCL device according to one or more exemplary embodiments.

The series variable impedance device, such as devices 411 and 412, can be a standalone variable impedance network 600 as shown in FIG. 6, which can be of either the active or passive type. Alternatively, the series variable impedance device may be formed by a variable impedance network 704 combined with a fixed impedance branch Z 705, typically resistive, connected in parallel as shown in FIG. 7. The standalone variable impedance 600 or the variable impedance network shown in FIG. 7 can be a variable inductor as shown in FIG. 8 which shows a variable impedance device or network 801 of either the active or passive type, to form part of a "condition-based impedance change" FCL device according to an exemplary embodiment.

Figure 9:
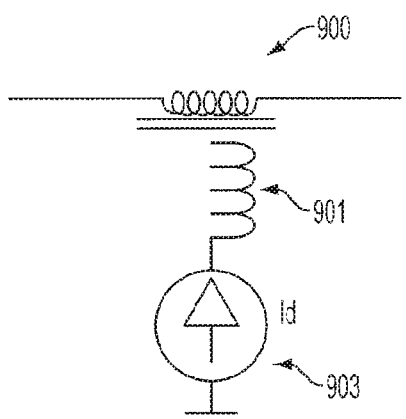
FIG. 9 shows a variable inductor of the active, "condition-based impedance change" FCL device type with a main winding to conduct AC current, and an auxiliary winding, typically arranged in an orthogonal manner to the same magnetic core, connected to a DC supply source, to vary the inductance value, according to one or more exemplary embodiments.

FIG. 9 shows a variable inductor in an active variable impedance device as a "condition-based impedance change" type FCL device. Specifically, the active variable impedance device includes an inductor 900 that is controlled by a control winding 901 which is connected to a controlled current source 903, which may be a DC supply source. The variable inductor has a main winding 900 to conduct the AC current, and an auxiliary winding 901, typically connected in an orthogonal manner to the same magnetic core, which is connected to the controlled current source 903 that supplies a current Id, to vary the inductance value.

Examples of passive variable impedance devices that can be used as the variable impedance devices shown in FIGS. 4A-4C, as illustrated in FIGS. 10-13.

Figure 10:
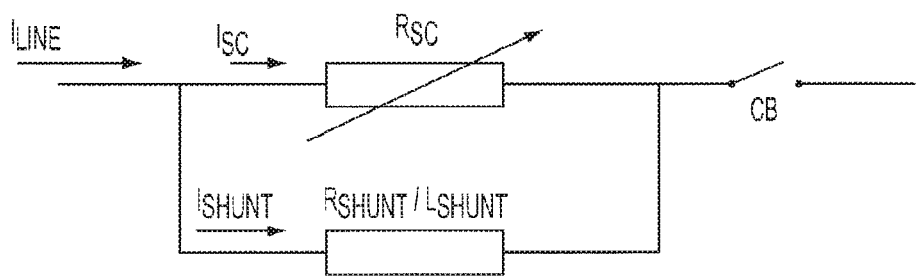
FIG. 10 illustrates a series FCL device according to one or more exemplary embodiments.

FIG. 10 shows an example of a series SFCL device. The series connected SFCL device includes a super conductive coil Rsc and a resistive and/or inductive impedance Rshunt/Lshunt that is connected in parallel across its terminals. When the line current increases above a certain value, the impedance of the superconducting coil increases, and the resultant SFCL impedance is determined mainly by the parallel connected impedance branch, which results in a fault current reduction. An example of such an SFCL device is the superconducting cable tie with inherent fault current limiter capabilities. An alternative to the device shown in FIG. 10 is the Shielded-Core FCL, whereby a cryogenic chamber is isolated from the high-voltage region by means of a series-connected transformer.

Figure 11:
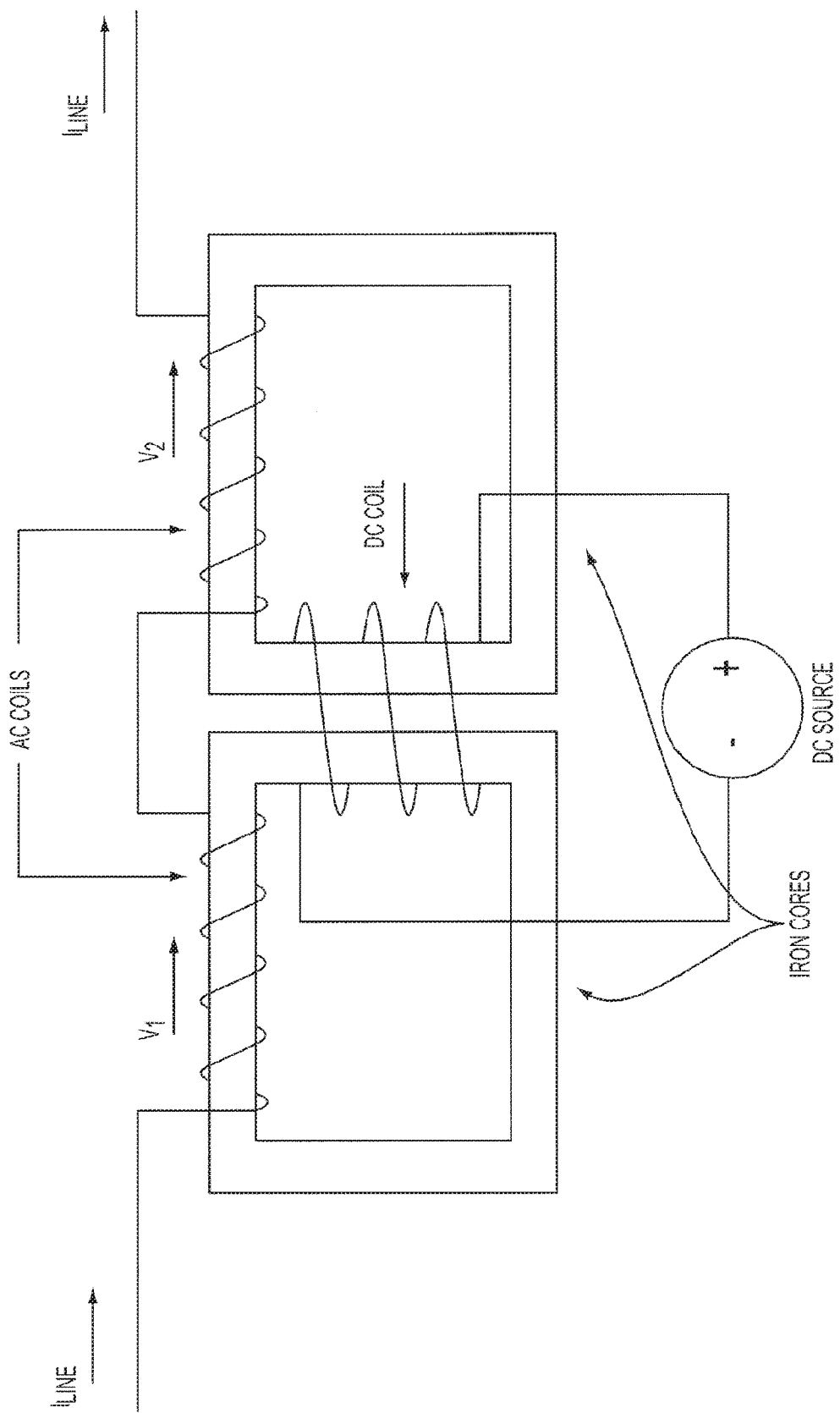
FIG. 11 illustrates a magnetic amplifier or saturable core FCL device's electric arrangement according to one or more exemplary embodiments.

FIG. 11 shows an example of a magnetic amplifier or saturable core FCL device. The figure shows an electric arrangement. Specifically, FIG. 11 shows another example of the "condition-based impedance change", passive type FCL formed with a magnetic amplifier or saturable core. The device shown in FIG. 11 employs two magnetic cores, each having an AC coil winding, and being electrically connected in series. The cores are permanently saturated by a DC winding that is wound around the two cores. By doing so, not only are the two cores saturated by DC, but, by providing the two AC coils with the same number of turns, the resultant AC flux is cancelled out, enabling the use a simple pure DC current source. When the line current reaches a fault level, each of the magnetic cores comes out of saturation in alternative half cycles, imposing a fault limiting impedance. The use of superconducting materials in the dc-coil to make the device a SFCL can be appreciated.

Currently, FCLs are not directly connected to wind turbines, but merely are placed such that they increase the fault current protection level of the network and substation of wind farms which are made up of wind turbines. The insertion of the FCL may reduce the fault current level making it possible to use conventional cabling and switchgear.

Figure 12:
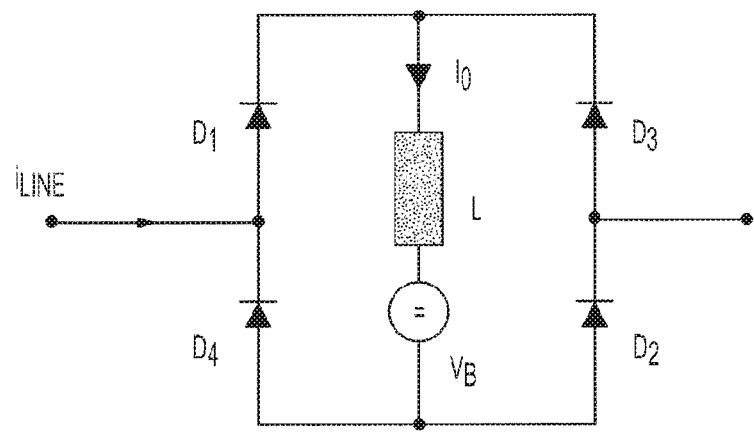
FIG. 12 is a schematic diagram of the diode-bridge FCL with a DC biased coil and external DC voltage source, according to one or more exemplary embodiments.

FIG. 12 shows a diode-bridge FCL with a DC biased coil and external DC voltage source. Particularly, certain arrangements, as seen in FIG. 12 for example, use a DC coil that can be implemented using superconducting wire, four diodes, and a DC voltage source that imposes a circulating DC current $I_O$. The $I_O$ current forward biases the four diodes. However, when the peak line current becomes greater than $I_O$ in a line fault situation, the diodes $D_3$ and $D_4$, or $D_1$ and $D_2$, may become reverse-biased during the positive or negative half cycle respectively. Then the FCL device imposes an inductance L that limits the fault current level.

According to an exemplary embodiment, the devices shown on FIG. 11 and FIG. 12 could also be actively controlled, although they may have a limited operation range. Particularly, the fault current limiting threshold may be adjusted within a certain range.

Figure 13:
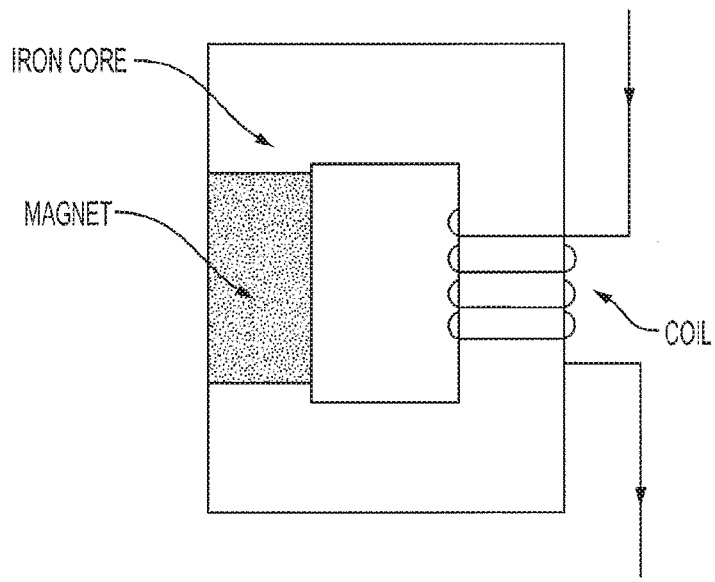
FIG. 13 illustrates an example of an embedded magnet saturable core FCL, device according to one or more exemplary embodiments.

FIG. 13 illustrates an example of an embedded magnet, saturable core FCL device schematic. A similar kind of saturable core may have a permanent magnet embedded in the core, as shown in FIG. 13. During normal operation the magnet is in a demagnetized state. Its permeability is close to the air value and the Magnetic FCL (MFCL) behaves like an air-cored reactor with a low inductance. When the fault occurs, the fault current drives the magnetic field beyond the magnet's coercive value. The magnet becomes magnetized and closes the flux path through the magnetic circuit. Thus the inductance of the device is increased which reduces the fault current level.

Figure 14:
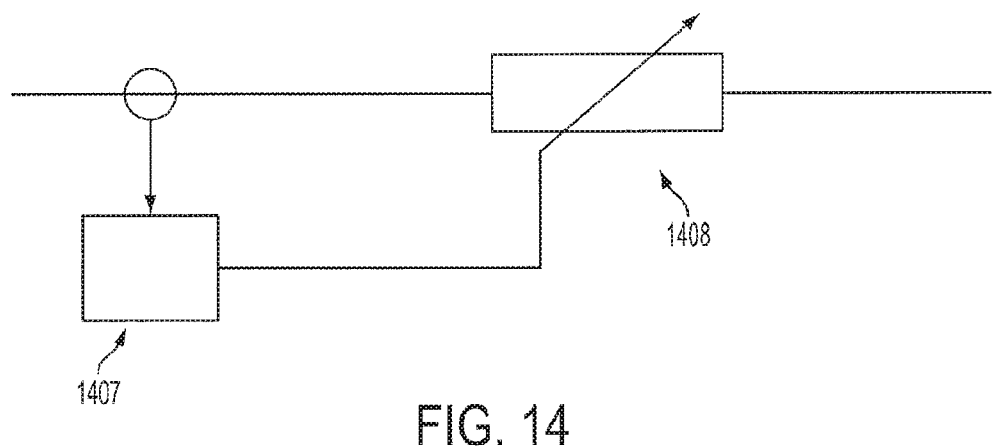
FIG. 14 shows an active variable impedance circuit connected in a series manner, according to one or more exemplary embodiments.

According to an exemplary embodiment, FIG. 14 shows an active variable impedance connected in a series manner. Particularly, FIG. 14 shows a variable impedance device, specifically, a variable inductor of the, "condition-based impedance increase" type FCL device. Specifically, the variable impedance device may include a control circuit 1407 which is connected to a variable impedance device 1408. A variable impedance of the active, "condition-based impedance change" type, as that shown in FIG. 9, could also be used instead of the passive type. In the case of using an active variable impedance device, a control circuit 1407 sends a command to vary the impedance value of the variable impedance device 1408, upon detection of the main current having risen above a certain threshold value.

Figure 15:
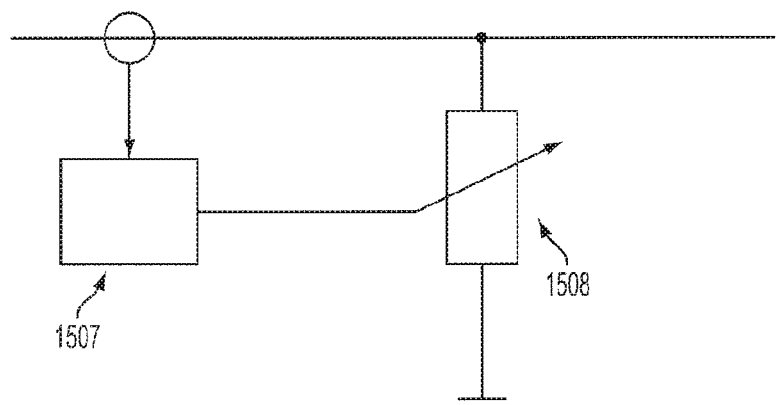
FIG. 15 shows a variable impedance circuit connected in a shunt configuration, according to one or more exemplary embodiments.

FIG. 15 shows a variable impedance device 1508 connected in a shunt manner. The variable impedance may either form a three-wire circuit or a four-wire circuit, if connected to ground or any other convenient point in the circuit. A control circuit 1507 sends a command signal the variable impedance device 1508 depending on the current level measured on the line.

The variable inductor shown in FIG. 15 is an active "condition-based impedance change" type FCL device. The FCL device may have a main winding to conduct the AC current, and an auxiliary winding, that typically would be arranged in an orthogonal manner to the same magnetic core, connected to a DC supply source, to vary the inductance value.

Figure 16:
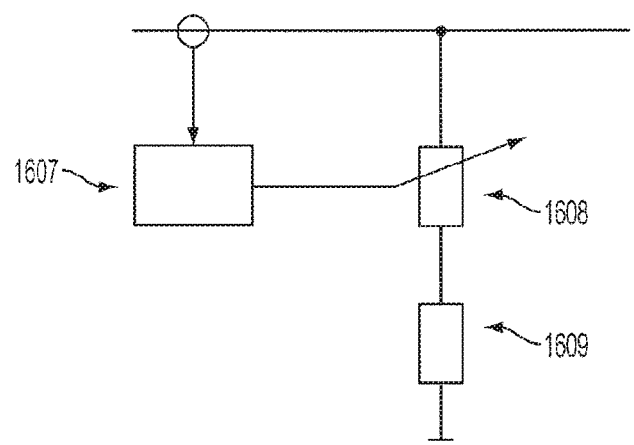
FIG. 16 shows a variable impedance circuit connected in a shunt manner in series with a fixed impedance network, according to one or more exemplary embodiments.

FIG. 16 shows a variable impedance device 1608 connected in a shunt manner in series with a fixed impedance network 1609. The variable impedance may either form a three-wire circuit or a four-wire circuit, if connected to ground or any other convenient point in the circuit. The variable impedance device 1608 is connected to a control circuit 1607. When the current is low, or in a range of normal operation, the control circuit 1607 sends a command signal to the variable inductor 1608 that maintains a high impedance value in the variable inductor 1608. Consequently, the resultant impedance of the shunt branch formed by elements 1608 and 1609 being connected in series is high, and a negligible amount of current flows through them. When the line current exceeds a certain threshold value, such as during a fault condition, the control circuit 1607 sends a signal to the variable impedance 1608 causing it to reduce its impedance value. Then, the shunt impedance is lowered and the line current is diverted into it, depending on the value of the variable impedance. If the value of the variable impedance becomes very low, the impedance of the shunt branch is equivalent to the impedance of the fixed impedance network 1609.

Figure 17:
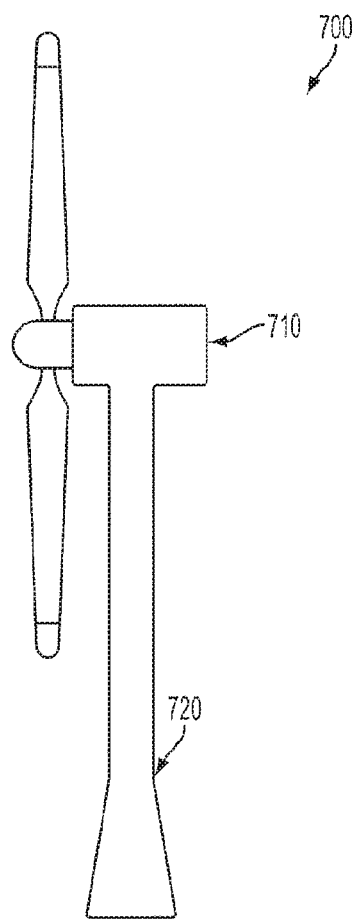
FIG. 17 illustrates a wind turbine housing.

FIG. 17 illustrates a wind turbine 700 which includes a nacelle 710 fixed to the top of a pedestal 720. The nacelle 710, the pedestal 720, or a combination of the nacelle and the pedestal can form the housing for the wind turbine. The nacelle 710 includes the generator, the power converter circuitry as well as other electronic gear. The variable impedance device and its associated components can be installed within the nacelle or within the pedestal of the wind turbine 700.

Figure 18A:
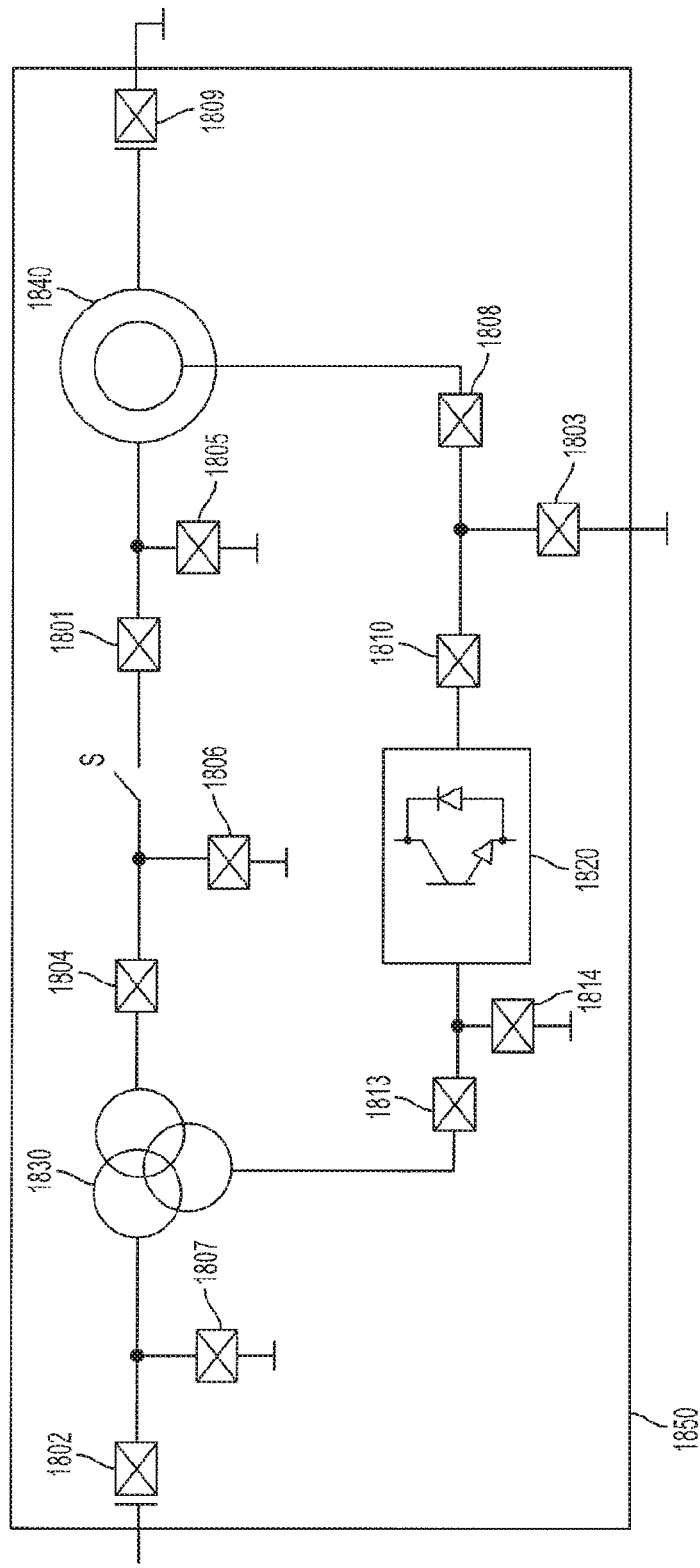
FIG. 18A through 18C illustrate DFIG wind turbine configurations showing the locations where one or more variable inductance type FCL devices can be placed and where step up/down transformers are provided to meet different voltage levels, according to one or more exemplary embodiments.
Figure 18B:
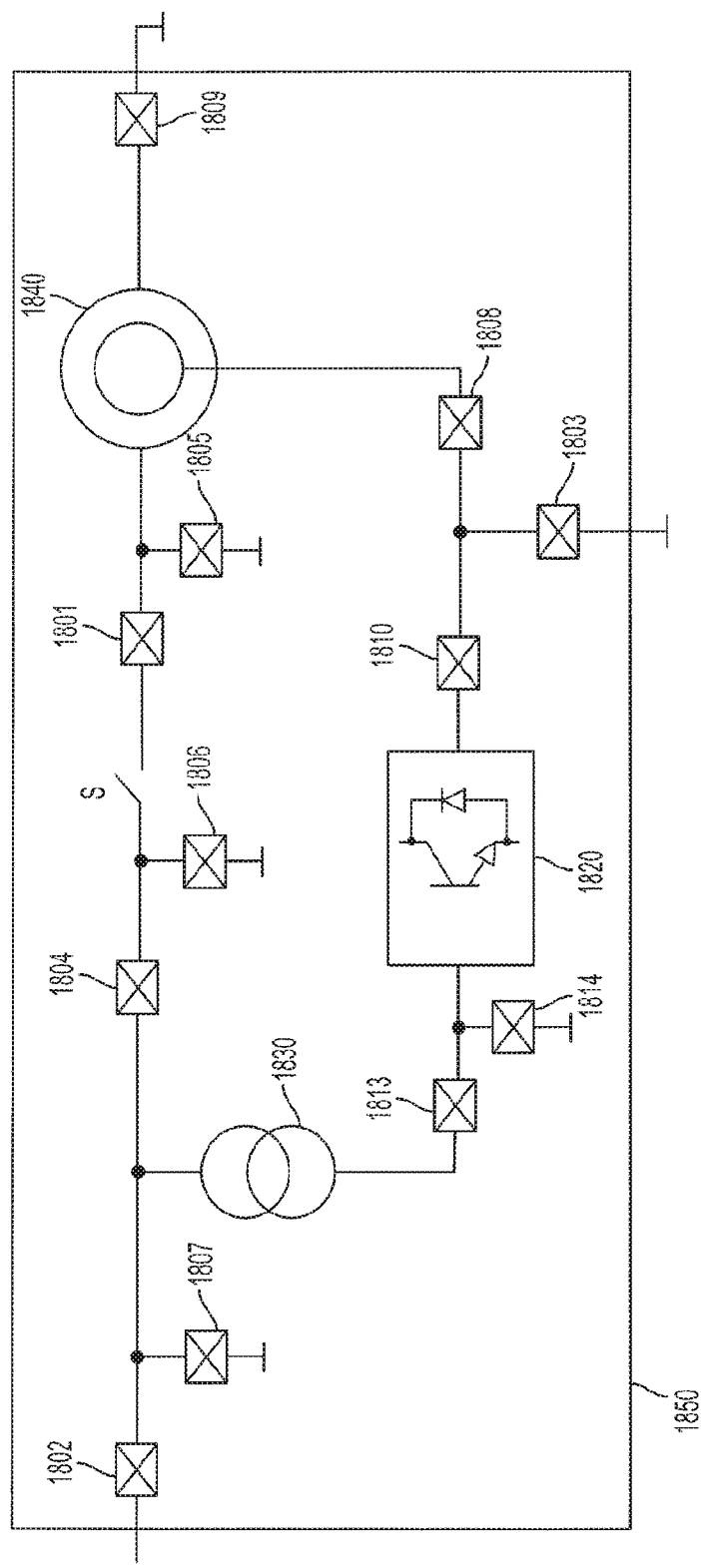
Figure 18C:
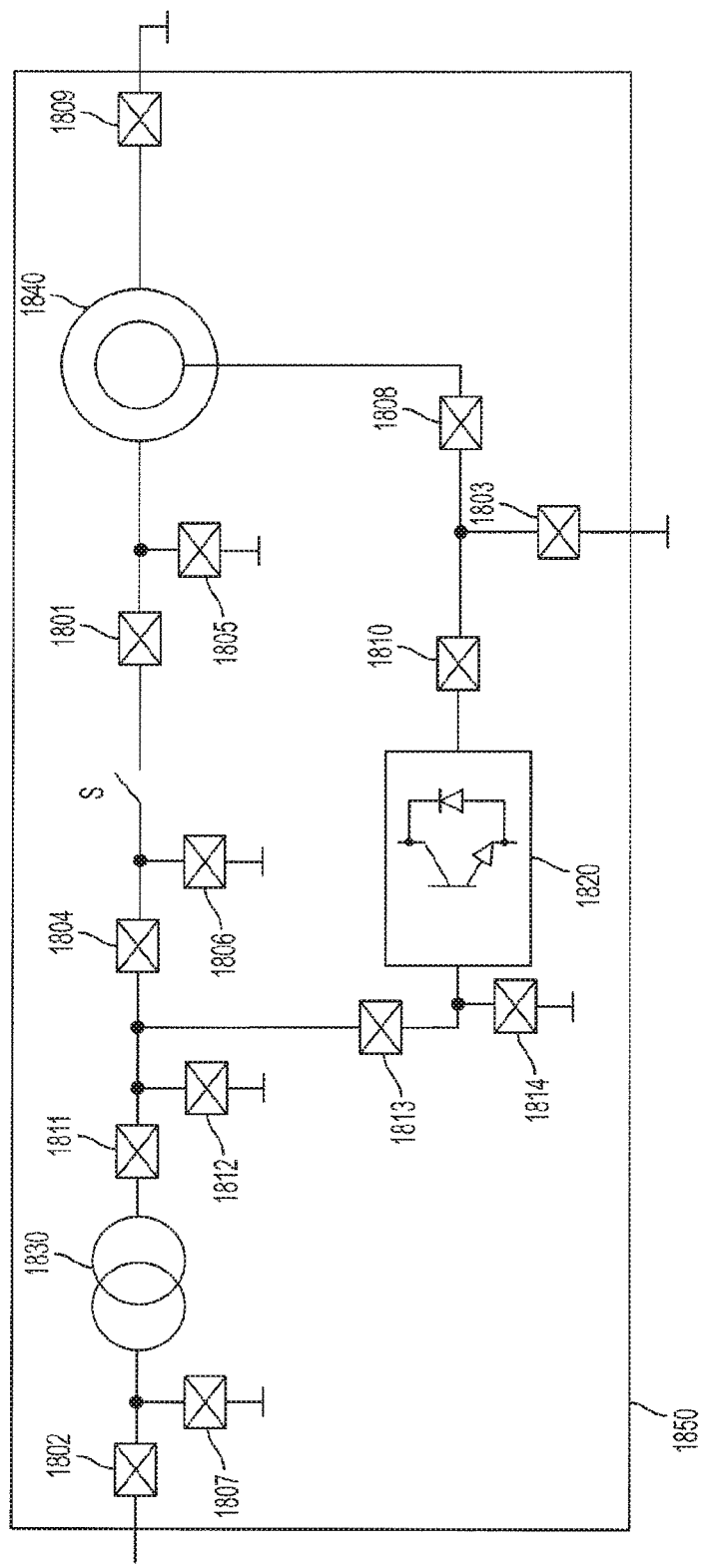

FIG. 18 shows locations in a wind turbine where series and/or shunt variable impedance devices of the condition based impedance change type FCL may be placed in accordance with exemplary embodiments of the invention. One or more exemplary embodiments may include a variable impedance FCL device connected in series with the main power flow at one or more of the locations in a wind turbine shown by either one or more of FCL devices 1801, 1802, 1804, 1808, 1810, 1811, and 1813, shown in the locations in FIGS. 18A through 18C. Moreover, the device 1809 could also be connected in a wye or delta fashion to the left-hand-side of the stator open end winding terminals, providing that a stator open-end winding configuration is available. These series devices may be of the passive, "condition-based impedance change" type. However, an active device will also serve for the purpose of the one or more exemplary embodiments.

One or more exemplary embodiments may also have a FCL device connected in a shunt arrangement with the main power flow. For example either one or more of the FCL devices 1803, 1805, 1806, 1807, 1812, and 1814, can be placed in the locations within a wind turbine as shown in FIGS. 18A-18C. These devices are of the active "condition-based impedance change" type FCL and include a variable impedance network 1508, as shown in FIG. 15, or a combination of a variable impedance networks with a fixed impedance network 1609, typically resistive, as shown in FIG. 16. The variable impedance network presents a high impedance value during normal operation, and presents a comparatively much lower impedance value in the presence of fault current levels. The impedance change is controlled by a control system 1607 that may sense the main current and acts when that current rises above a certain threshold value. Such a variable impedance device can be implemented by the active or controlled variable inductor shown in FIG. 9.

One or more exemplary embodiments could also include any one or more of the series connected FCL devices 1801, 1802, 1804, 1808, 1810, 1811, and 1813, in combination with any one or more of the shunt connected FCL devices 1803, 1805, 1806, 1807, 1812, and 1814, shown in FIGS. 18A-18C.

Specifically, FIG. 18A shows a DFIG wind turbine configuration that includes a generator 1840 that has a stator and a rotor where the stator, rotor, and grid voltage supply present different voltage levels according to one or more exemplary embodiments. A step up/down transformer 1830 may be provided to meet the different voltage levels.

FIG. 18B shows a DFIG wind turbine configuration that includes a generator 1840 that has a stator and a rotor where the stator and the grid voltage supply present the same voltage, but is different to that of the rotor according to one or more exemplary embodiments. A step up/down transformer 1830 may be provided to meet the different voltage levels.

FIG. 18C shows a DFIG wind turbine configuration that includes a generator 1840 that has a stator and a rotor where the stator and the rotor present the same voltage, but that voltage is different from that of the grid supply, according to one or more exemplary embodiments. A step up/down transformer 1830 may be provided to meet the different voltage levels. According to one or more exemplary embodiments, a difference between the structures shown in FIGS. 18B and 18C is in the voltage rating of the stator of the wind turbine machine in each figure.

The embodiments described here can be used for any of the presented wind turbine configurations in which the main step up/down transformer has different connection points and power ratings. These configurations define an appropriate solution in each case, and the size and activation limits of the variable impedance device will vary based on those configurations. In each case, the voltage level is different at the different locations where the variable impedance device could be connected, and because of the different impedances of each transformer type, the maximum current and voltage levels the variable impedance device should withstand may vary. According to one or more exemplary embodiments, as shown in FIGS. 18A through 18C, there may be provided a plurality of variable impedance devices, which may be FCL components, within a wind turbine, such as, for example, devices 1802 and 1807, 1804 and 1806, and 1801 and 1805, etc. However, one or more exemplary embodiments do not require all the individual FCL elements as shown, and may implement as many as only one of the FCLs. Thus, in accordance with one or more exemplary embodiments, the FCL placement as shown in FIGS. 18A through 18C may be understood as being any one, more than one, or all of the FCLs shown, or any combination thereof. Accordingly, FIGS. 18A through 18C show a plurality of the different options for placement of an FCL, or combination of FCLs, within the wind turbine. According to exemplary embodiments, any one FCL placed in any one of the indicated locations may be sufficient to suppress an electrical transient. Specifically, one or more exemplary embodiments could include only one variable impedance device connected in series as shown in FIG. 4A. According to another one or more exemplary embodiments there could be only one variable impedance device connected in a shunt arrangement as shown in FIG. 4C.

According to one or more exemplary embodiments a switch S, shown in FIGS. 18A-18C, typically may be installed in the wind turbine to isolate the stator windings. With use of the variable impedance device in the various embodiments described here, the switch can stay closed during a fault so that the generator stays connected to the grid to provide a fault ride through capability. Further, there may be more than one such switch of this kind, depending on the particular embodiment. For instance, an additional switch may be installed between a converter 1820, which according to an exemplary embodiment may be a back-to-back (B2B) converter, and a transformer 1830.

The FCL devices described herein may change impedance in discreet and defined steps in one ore more exemplary embodiments. Alternatively, the FCL devices may present a continuous variation of impedance values. The FCL devices also could serve the additional purpose of mitigating or damping a possible resonance, for instance resonance occurring due to the interaction of the grid with the wind turbine converter, like the grid-side filters.

According to one or more exemplary embodiments, the wind turbine configurations shown in FIGS. 18A through 18C may be entirely placed within a single housing 1850, wherein the housing may include the entire wind turbine structure, or may be specifically placed within a housing such as a nacelle of the wind turbine.

Figure 19A:
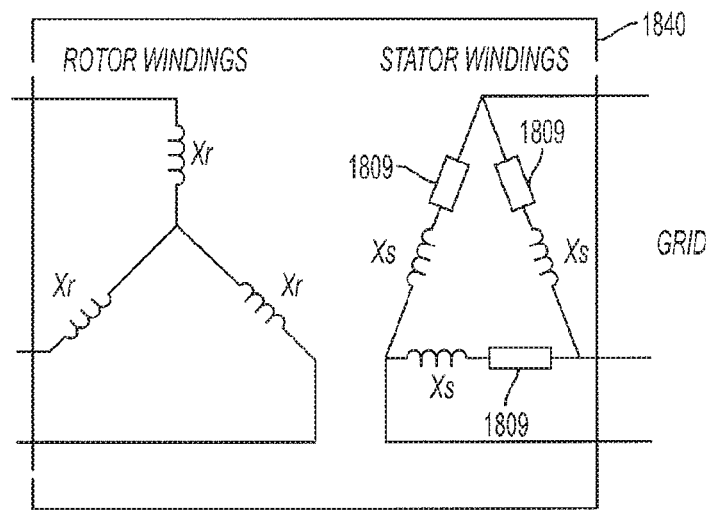
FIGS. 19A and 19B show wye and delta configurations of a rotor winding and stator winding of a generator and variable impedance devices connected thereto, according to one or more exemplary embodiments.
Figure 19B:
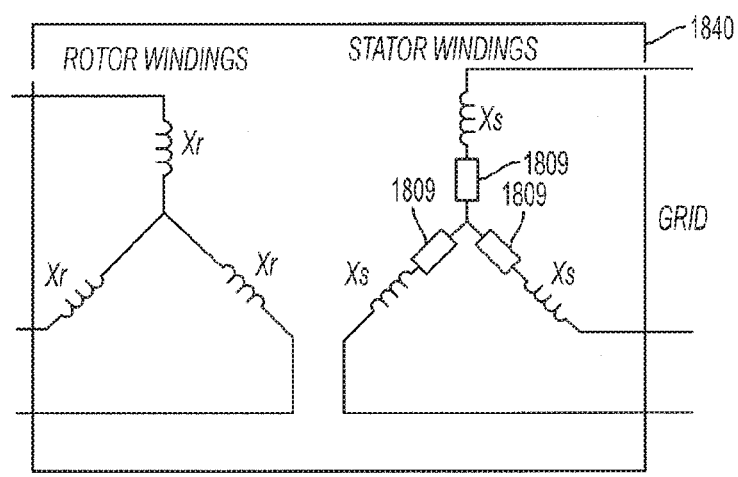

Moreover, according to one or more exemplary embodiments, one or more of a devices 1809 may be connected in a wye or delta fashion to the stator open end winding terminals, provided the stator open-end winding configuration is present, as shown in FIGS. 19A and 19B. Further, as shown in FIGS. 19A and 19B rotor leakage inductance Xr as well as stator leakage inductance Xs is shown in a stator open-end winding configuration. FIG. 19A shows a stator open-end winding configuration in a delta connection arrangement. FIG. 19B shows a stator open-end winding configuration in a wye connection arrangement. Additionally, in accordance with one or more exemplary embodiments, variable impedance devices 1809 are placed in a one or more arrangements and locations as shown in FIGS. 19A and 19B.

According to another one or more exemplary embodiments, only one of the shown variable impedance devices 1809 may be included in the stator winding in one of the locations as shown in FIGS. 19A and 19B. Alternatively, all of the shown variable impedance devices 1809 may be included as shown, or a sub-combination, for example only two of the variable impedance devices, may be included.

As shown in FIG. 20, the variable impedance device 2010, for example a fault current limiter described here, can be installed in individual wind turbines so that at the PCC, an individual wind turbine satisfies regulatory and/or customer electrical requirements during low voltage conditions. Further, by installing the variable impedance device 2010 within an individual wind turbine and in close proximity to the power converter 2020, the variable impedance device 2010 may also operate to protect the wind turbine's power converter 2020 from damage due to excessive currents caused by a low voltage event, provided that it has been designed for that purpose. Accordingly, the variable impedance device 2010, which can be implemented with the series variable inductors described herein and shown in the figures, are installed within close proximity to the wind turbine's generator 2040 and power converter 2020 and in certain embodiments are installed within the same housing of the wind turbine that encloses the generator and power converter. For example, in FIG. 20, a variable impedance device 2010, such as an FCL, a generator 2040 (which includes a stator 2044 and a rotor 2042), and a power converter 2020, which according to an exemplary embodiment may be a back-to-back (B2B) converter, as well as a transformer 2030 may be placed within the same housing 2050, as shown. Further, according to another exemplary embodiment, these elements may be specifically placed within the nacelle of the wind turbine.

The growth of wind power generation is forcing the creation of new grid code specifications, so the wind power generation must adapt to these new requirements. These requirements are focused on two main points: no disconnection of the wind turbine from the grid and the wind turbine's contribution to the grid stability. Supplying reactive power to the grid during a fault can be requirement for connection to the grid. Various exemplary embodiments can be configured to provide reactive power to the grid when a fault occurs.

Figure 2:
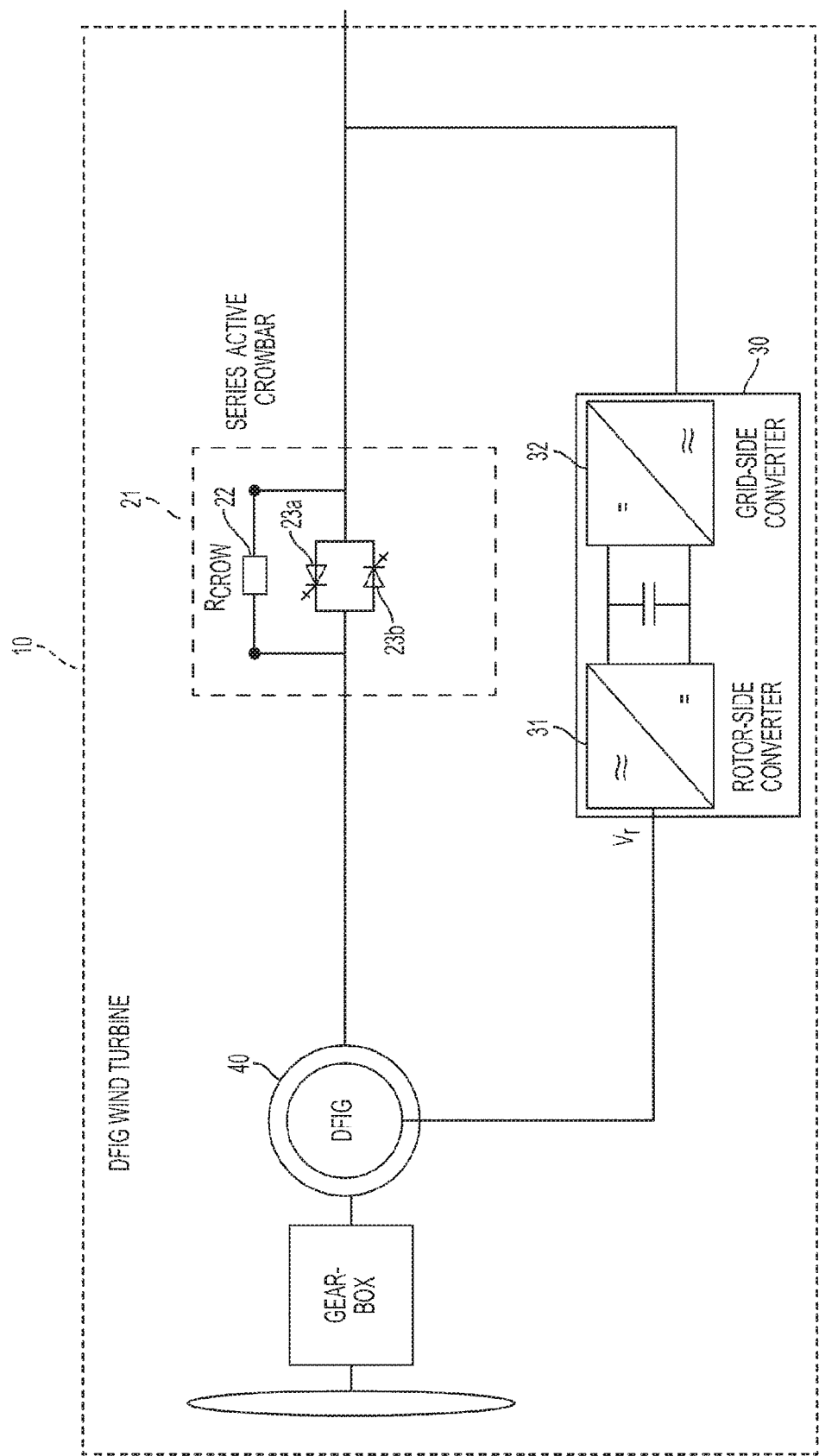
FIG. 2 illustrates a wind turbine equipped with a series active crowbar circuit.
Figure 3:
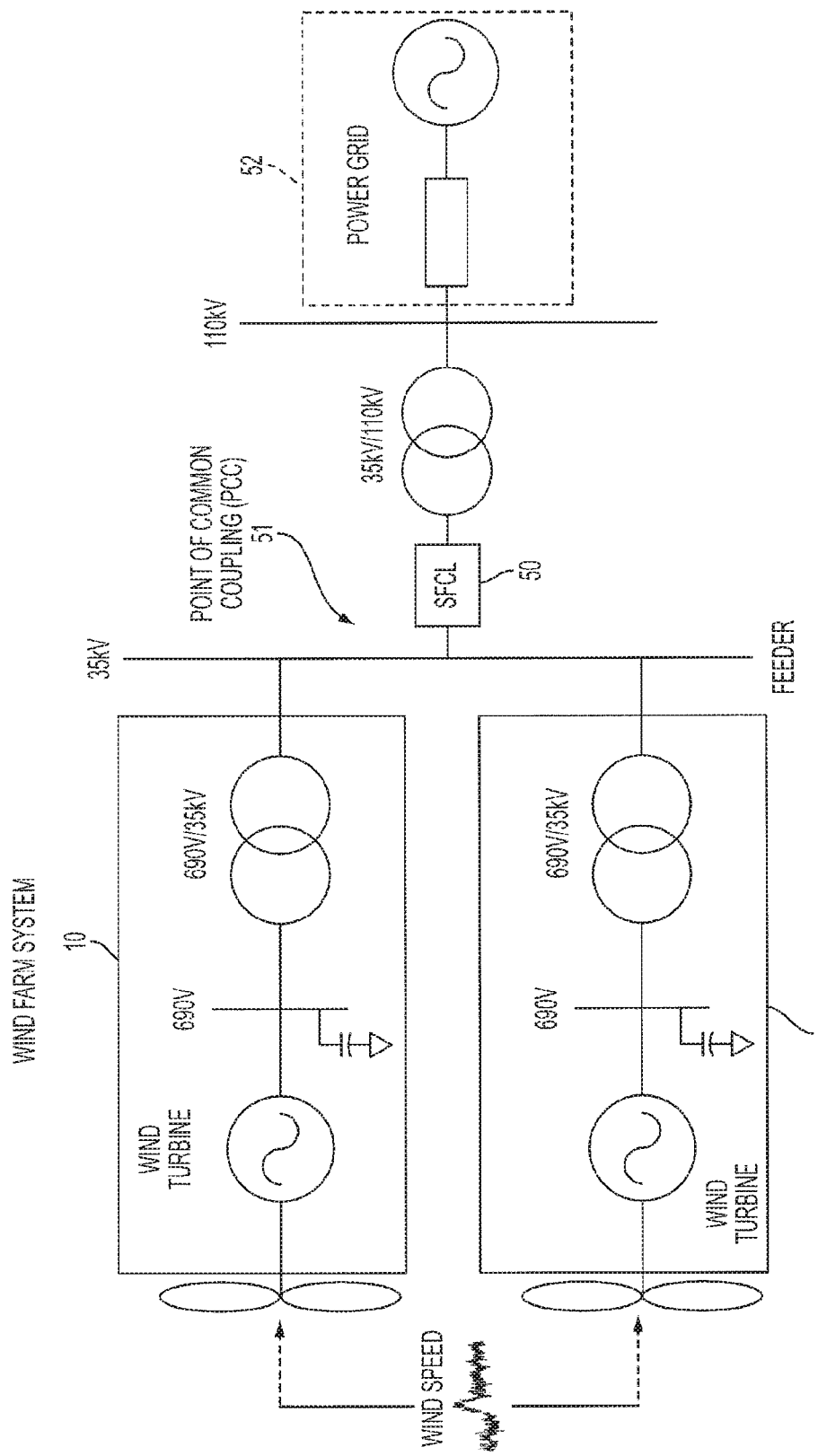
FIG. 3 illustrates a single-wire diagram of an SFCL connected before the PCC of a wind farm.

Prior systems that use resistive circuits to dissipate active power during a fault, such as the crowbar circuits shown in FIGS. 1 and 2, do not deliver substantial or sufficient reactive power from the rotor or the stator to satisfy grid code requirements, or are not able to deliver it as fast as it is required, since the injection is not controlled while the crowbar is connected.

Exemplary embodiments of the invention can supply substantial reactive power to the grid during a fault in both the shunt connected variable impedance device configuration and the series connected variable impedance device configuration.

Exemplary embodiment that employ a shunt connected variable impedance device, such as the embodiments shown in FIGS. 4B and 4C, and various configurations shown in FIGS. 18A-C, allow required amounts of reactive power to be provided from the stator to the grid with an appropriate sizing of the variable impedance device. Since rotor or stator terminals are not short circuited through a resistor in these embodiments, reactive power is delivered to the grid when the variable impedance device is designed to vary it's impedance within a certain impedance range. In the case where the variable impedance device is an inductor, the inductance changes in a range between a minimum value Lmin and a maximum value Lmax. These values are selected depending on the installation components and specific requirements or customer's specifications, such voltage profiles (low voltage ride through and high voltage ride through) that the system should be able to withstand, the reactive current injection levels and times, and the power converter's components that should be protected.

Exemplary embodiment that employ a series connected variable impedance device, such as the embodiments shown in FIG. 4A, various configurations shown in FIGS. 18A-C, and the embodiment shown in FIG. 19, allow reactive power to be provided from the stator to the grid with an appropriate sizing of the variable impedance device. In some wind turbines the mechanical torque control dynamic is so low that an acceleration of the generator during the beginning of the fault is produced. In the circuit shown in FIG. 4A, for example, if such acceleration would occur the fixed impedance device RA 450, which is connected in parallel to the variable impedance device, dissipates active power and thus maintains the generator's speed while the variable impedance device delivers reactive current to the grid.

In addition or as an alternative to the above, the following embodiments are described:

Embodiment 1 is directed to a wind turbine including a housing; an asynchronous generator disposed in the housing and configured to be electrically connected to a power grid connection; a power converter circuit disposed in the housing and configured to be electrically connected to the asynchronous generator; and a variable impedance device disposed in the housing, connected to the generator and configured to limit current by varying impedance in response to a transient current.

Embodiment 2 is directed to the wind turbine of embodiment 1, wherein the variable impedance device is arranged in series between the asynchronous generator and the power grid connection.

Embodiment 3 is directed to the wind turbine of embodiment 2, further comprising a fixed impedance device connected in parallel with the variable impedance device.

Embodiment 4 is directed to the wind turbine of embodiment 3, wherein the variable impedance device is a variable inductor.

Embodiment 5 is directed to the wind turbine of embodiment 4, wherein the fixed impedance device is a resistor.

Embodiment 6 is directed to the wind turbine of embodiment 1, wherein the variable impedance device is connected in a shunt arrangement between the asynchronous generator and a neutral point.

Embodiment 7 is directed to the wind turbine of embodiment 6, further comprising a fixed impedance device connected in series with the asynchronous generator and the variable impedance device.

Embodiment 8 is directed to the wind turbine of embodiment 7, wherein the variable impedance device is a variable inductor.

Embodiment 9 is directed to the wind turbine of embodiment 8, wherein the fixed impedance device is a resistor Embodiment 10 is directed to the wind turbine according to embodiments 1-9, further comprising a controller configured to control the variable impedance device in response to detection of the transient current to vary impedance.

Embodiment 11 is directed to the wind turbine according to embodiments 1-5, wherein the variable impedance device limits current by passively varying impedance in response to the transient current.

Embodiment 12 is directed to the wind turbine according to any one of embodiments 1-11, wherein the variable impedance device is selected from a group consisting of a variable inductor, a fault current limiter (FCL), a super conductor FCL (SFCL), a magnetic amplifier and saturable core FCL (MFCL), a diode-bridge FCL with DC biased coil, and an embedded magnet and saturable core FCL device.

Embodiment 13 is directed to the wind turbine according to any one of embodiments 1-12, further comprising a second variable impedance device disposed in the housing, electrically connected to the asynchronous generator, and configured to vary impedance in response to the transient.

Embodiment 14 is directed to the wind turbine according to any one of embodiments 1-13, wherein the wind turbine delivers reactive power to the power grid when the variable impedance device varies impedance in response to the transient current.

Embodiment 15 is directed to the wind turbine including a housing; an asynchronous generator configured to be electrically connected to a connection to a power grid and generate a current; a power converter circuit configured to be electrically connected to the asynchronous generator and convert the current; means for varying impedance to limit the converted current in response to a transient current, said asynchronous generator, said power converter circuit and said means for varying impedance disposed in the housing.

Embodiment 16 is directed to a method for controlling current in a wind turbine, the method including generating a current using an asynchronous generator disposed in a housing of the wind turbine; converting the current using a power converter circuit disposed in the housing; limiting the converted current in response to a transient current in a power grid by varying impedance of a variable impedance device disposed in the housing and electrically connected to the asynchronous generator; and outputting the limited current to a connection to the power grid.

Embodiment 17 is directed to the method according to embodiment 16, further comprising controlling the variable impedance device in response to detection of the transient current to vary impedance.

Embodiment 18 is directed to the method according to embodiment 16, further comprising the variable impedance device limiting current by passively varying impedance in response to the transient current.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A wind turbine comprising:
a housing;
an asynchronous generator comprising a stator, a rotor, and a neutral point, and disposed in the housing and configured to be electrically connected to a power grid connection;
a power converter circuit disposed in the housing and configured to be electrically connected to the asynchronous generator; and
a variable inductive impedance device disposed in the housing, connected to the rotor of the generator and configured to limit current by varying impedance in response to a transient current.

2. The wind turbine of claim 1, wherein the variable inductive impedance device is arranged in series between the asynchronous generator and the power grid connection.

3. The wind turbine of claim 2, further comprising a fixed impedance device connected in parallel with the variable inductive impedance device.

4. The wind turbine of claim 3, wherein the fixed impedance device is a resistor.

5. The wind turbine of claim 1, wherein the variable inductive impedance device is connected in a shunt arrangement between the asynchronous generator and the neutral point.

6. The wind turbine of claim 5, further comprising a fixed impedance device connected in series with the asynchronous generator and the variable inductive impedance device.

7. The wind turbine of claim 5, wherein the fixed impedance device is a resistor.

8. The wind turbine according to claim 1, further comprising a controller configured to control the variable inductive impedance device in response to detection of the transient current to vary impedance.

9. The wind turbine according to claim 1, wherein the variable inductive impedance device limits current by passively varying impedance in response to the transient current.

10. The wind turbine according to claim 1, wherein the variable inductive impedance device is selected from a group consisting of a fault current limiter (FCL), a super conductor FCL (SFCL), a magnetic amplifier and saturable core FCL (MFCL), a diode-bridge FCL with DC biased coil, and an embedded magnet and saturable core FCL device.

11. The wind turbine according to claim 1, further comprising a second variable inductive impedance device disposed in the housing, electrically connected to the asynchronous generator, and configured to vary impedance in response to the transient.

12. The wind turbine according to claim 1, wherein the wind turbine delivers reactive power to the power grid when the variable inductive impedance device varies impedance in response to the transient current.

13. A wind turbine comprising:
a housing;
an asynchronous generator comprising a stator, a rotor, and a neutral point, and configured to be electrically connected to a connection to a power grid and generate a current;
a power converter circuit configured to be electrically connected to the asynchronous generator and convert the current;
inductive means for varying impedance to limit the converted current in response to a transient current, said asynchronous generator, said power converter circuit and said inductive means for varying impedance disposed in the housing and connected to the rotor of the generator.

14. A method for controlling current in a wind turbine, the method comprising:
generating a current using an asynchronous generator disposed in a housing of the wind turbine;
converting the current using a power converter circuit disposed in the housing;
limiting the converted current in response to a transient current in a power grid by
varying impedance of a variable inductive impedance device disposed in the housing and electrically connected to a rotor of the asynchronous generator; and
outputting the limited current to a connection to the power grid.

15. The method according to claim 14, further comprising controlling the variable inductive impedance device in response to detection of the transient current to vary impedance.

16. The method according to claim 14, further comprising the variable inductive impedance device limiting current by passively varying impedance in response to the transient current.

17. The wind turbine according to claim 1, wherein the variable inductive impedance device varies impedance in a plurality of discreet and defined steps or by a continuous variation of impedance values.

18. The wind turbine according to claim 17, wherein the asynchronous generator stays connected to the power grid connection throughout the duration of the transient current providing a fault ride through capability.

19. The method according to claim 12, wherein the variable inductive impedance device varies impedance in a plurality of discreet and defined steps or by a continuous variation of impedance values.

20. The method according to claim 19, further comprising providing a fault ride through capability by maintaining the asynchronous generator connection to the power grid connection throughout the duration of the transient current.

* * * * *